P. L. T. HÉROULT.
PROCESS OF TREATING ORES.
APPLICATION FILED APR. 19, 1906.
930,666. Patented Aug. 10, 1909.
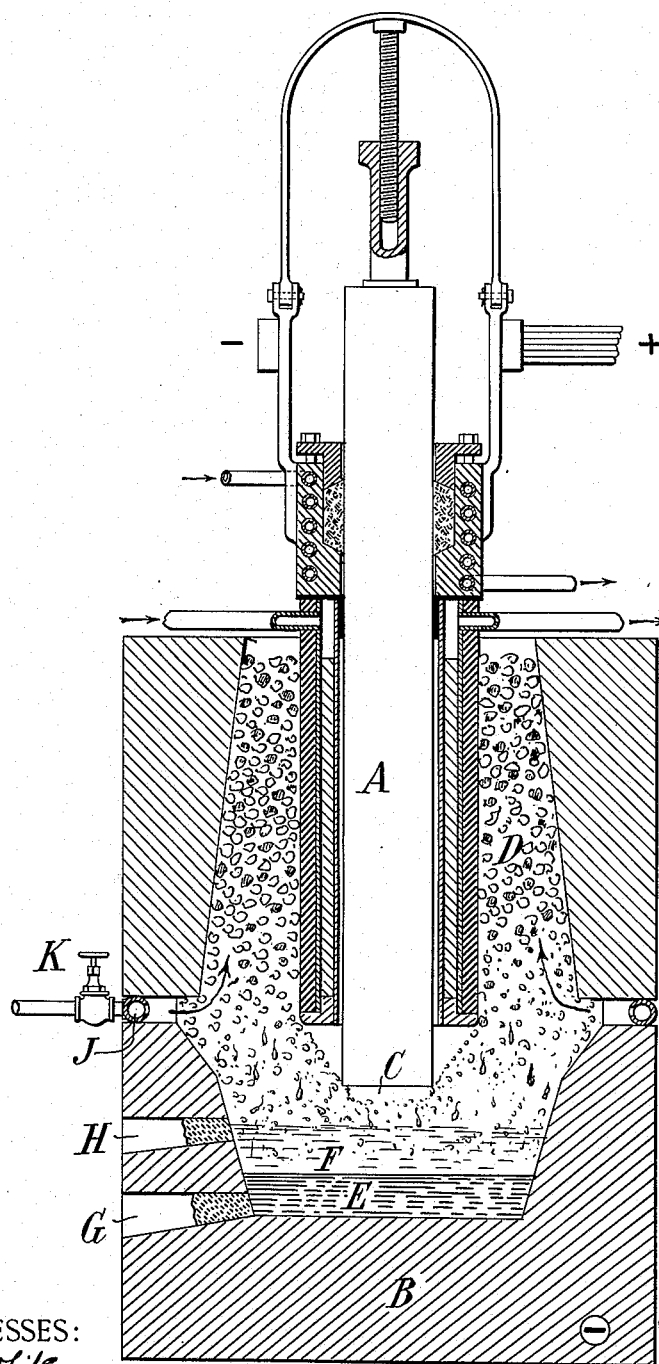

UNITED STATES PATENT OFFICE.

PAUL LOUIS TOUSSAINT HÉROULT, OF LA PRAZ, FRANCE, ASSIGNOR TO SOCIETE ELECTRO-METALLURGIQUE FRANCAISE, OF FROGES, FRANCE.

PROCESS OF TREATING ORES.

No. 930,666.　　　Specification of Letters Patent.　　　Patented Aug. 10, 1909.

Application filed April 19, 1906. Serial No. 312,658.

*To all whom it may concern:*

Be it known that I, PAUL LOUIS TOUSSAINT HÉROULT, a citizen of the Republic of France, residing at La Praz, Savoie, France, have invented certain new and useful Improvements in Processes of Treating Ores, of which the following is a specification.

This invention aims to provide an improved process of treating sulfid ores, and which is applicable especially to the treatment of copper ores.

In the usual process of treating copper ores to extract the copper therefrom, the ore is smelted to obtain a matte of copper sulfid and iron sulfid, the smelting eliminating the silicates and other impurities constituting the gangue. The resulting matte is of approximately the composition of $mFeS_2, nCuS$ with varying quantities of the copper sulfid and the iron sulfid, so that the percentage of copper varies from 30 to 60, 50 being a usual percentage. The matte is then treated in a vessel similar to a Bessemer converter, which burns out the iron and most of the sulfur, leaving what is known as black copper, which is approximately 90 per cent. pure.

I propose to treat the ore by a method which permits of perfect regulation of the heat on the one hand, and regulation of the consumption of iron and sulfur on the other hand, so that a black copper or a rich matte may be obtained without special difficulty, and directly from ores of widely varying compositions. For this purpose I propose to feed the ore into an electric furnace, fusing it therein and simultaneously injecting air, or oxygen in any other form, into the ore, so as to oxidize part of the sulfur. Preferably sufficient oxygen is introduced to oxidize a large part of the sulfur and iron, so as to leave only a black copper melt with a slag containing the gangue and the iron. Or as a substitute for an ordinary pyritic smelting for obtaining a rich matte, I propose to blow in only enough air to get rid of part of the sulfur and part of the iron. The combustion of the sulfur and iron by means of the oxygen introduced, has the further value of heating the charge previous to its being melted down by the current. Various types of electric furnace (arc, incandescent, or combination) may be used.

A great advantage of this process is the separation of the step of oxidizing the iron and sulfur from the step of fusing. A certain amount of heat is furnished to the charge by the oxidation referred to, but not enough to affect the regulation. The fusing on the other hand is effected without oxidation. Therefore a wide range of operations may be effected with perfect accuracy. At one end of the series of operations would be the mere fusing of the sulfids as the ore passes through the zone of fusion of the furnace and without any oxidation of the iron and sulfur. At the other end of the series would be the introduction of oxygen in such quantities as to consume all the iron and all the sulfur. These two extremes are theoretical, but between the two there is possible the greatest range of adjustment, so that practically any sulfid ore may be treated to produce practically any desired product.

The accompanying drawing is a vertical section, more or less diagrammatic, of a furnace suitable for the purpose.

The current enters through the electrode A and passes out through the body B of the furnace. The arc is indicated at C and the zone of fusion by the drops of molten material. The ore D is introduced at the top of the furnace, and is gradually fed down through the zone of fusion, the resulting product forming in a pool E at the bottom of the furnace, with a layer of slag F floating thereon. The desired product E and the slag F are drawn off at desired intervals through tap holes G and H. The air is introduced through an annular pipe J above the zone of fusion, and mingles thoroughly with the ore, rising through the same and effecting the reduction described. A valve, indicated typically at K, determines the pressure or quantity of air injected.

Though I have described with great particularity of detail certain specific embodiments of my invention, yet it is not to be understood therefrom that the invention is limited to the exact embodiments disclosed. Various modifications may be made by those skilled in the art, without departure from the invention.

What I claim is:—

1. The method of treating copper ore containing sulfur which consists in feeding it into an electric furnace and fusing it therein and simultaneously injecting oxygen into the ore to oxidize part of the sulfur.

2. The method of treating copper ore containing sulfur and iron which consists in feeding it into an electric furnace and fusing it therein and simultaneously injecting oxygen in sufficient quantity to oxidize a large part of the sulfur and iron, and to leave only a black copper melt with a slag of gangue and iron.

3. The method of treating copper ore containing sulfur which consists in feeding it into an electric furnace and passing it gradually through a zone of fusion in said furnace, and simultaneously injecting oxygen into the ore above the zone of fusion to oxidize part of the sulfur.

4. The method of treating copper ore containing sulfur which consists in feeding it into an electric arc furnace and passing it gradually through a zone of fusion adjacent to the arc and drawing off the fused product at intervals, and simultaneously injecting oxygen in sufficient quantity into the ore above the zone of fusion to oxidize a large part of the sulfur and iron, and to leave only a black copper melt with a slag of gangue and iron.

5. The method of smelting sulfid ores, which consists in oxidizing the ore by air and simultaneously applying heat thereto by means of an electric current, substantially as described.

6. The method of smelting pyritic ores containing copper, which consists in oxidizing the ore by air and simultaneously applying heat thereto by means of an electric current, substantially as described.

In witness whereof, I have hereunto signed my name in the presence of two subscribing witnesses.

PAUL LOUIS TOUSSAINT HÉROULT.

Witnesses:
    DONUNGO A. USINA,
    FRED WHITE.